United States Patent
Kouzaki

(10) Patent No.: US 11,167,563 B2
(45) Date of Patent: Nov. 9, 2021

(54) INK-JET RECORDING APPARATUS, INK-JET RECORDING METHOD, AND INK-JET RECORDING PROGRAM

(71) Applicant: Konica Minolta, Inc., Tokyo (JP)

(72) Inventor: Masahiro Kouzaki, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/886,004

(22) Filed: May 28, 2020

(65) Prior Publication Data
US 2020/0376853 A1 Dec. 3, 2020

(30) Foreign Application Priority Data
May 28, 2019 (JP) .............................. JP2019-099460

(51) Int. Cl.
*B41J 2/21* (2006.01)
*B41J 2/045* (2006.01)

(52) U.S. Cl.
CPC ............ *B41J 2/211* (2013.01); *B41J 2/04508* (2013.01); *B41J 2/04536* (2013.01); *B41J 2/04586* (2013.01)

(58) Field of Classification Search
CPC .... B41J 2/211; B41J 2/04508; B41J 2/04536; B41J 2/04586
See application file for complete search history.

(56) References Cited

U.S. PATENT DOCUMENTS

2018/0272745 A1* 9/2018 Ichioka .................... B41J 2/155

FOREIGN PATENT DOCUMENTS

JP 2007-152582 A 6/2007

* cited by examiner

*Primary Examiner* — Thinh H Nguyen
(74) *Attorney, Agent, or Firm* — Osha Bergman Watanabe & Burton LLP

(57) ABSTRACT

An ink-jet recording apparatus includes: head modules each including nozzles disposed in a row; a transporter that moves a recording medium with respect to the head modules in a direction intersecting with an arrangement direction of the nozzles; a recording controller that causes the nozzles to eject ink onto the recording medium and to form a dot based on image data; and a memory that stores arrangement position information indicating individual positional deviations of the nozzles in a relative movement direction of the head modules with respect to the recording medium. The head modules are disposed in the arrangement direction of the nozzles. The transporter causes a same point of the recording medium to pass through a position where upstream and downstream nozzles that correspond to two adjacent head modules eject ink.

27 Claims, 13 Drawing Sheets

INK-JET RECORDING APPARATUS, INK-JET RECORDING METHOD, AND INK-JET RECORDING PROGRAM

CROSS-REFERENCE TO RELATED APPLICATION

This application claims priority from Japanese Patent Application No. 2019-099460 filed on May 28, 2019, the entire contents of which are incorporated herein by reference.

TECHNICAL FIELD

The present invention relates to an ink-jet recording apparatus, an ink-jet recording method, and an ink-jet recording program. One or more embodiments of an ink-jet recording apparatus, an ink-jet recording method, and an ink-jet recording program capable of using a line head arranged with a plurality of head modules may inhibit image quality degradation (reduce image incongruity such as a gloss difference and a streak) in an overlapping area (joint) between adjacent head modules.

BACKGROUND

An ink-jet recording apparatus that forms an image by ejecting ink droplets from an ink-jet head to a recording medium has been widely used in recent years because of its simple structure, easiness to reduce a size and weight, and low power consumption.

As an ink-jet recording apparatus, there is a so-called single-pass recording apparatus using a line head in which a plurality of short head modules are arranged in zigzag, as an ink-jet head. In such an ink-jet recording apparatus, image quality degradation (image incongruity such as a gloss difference and a streak) occurs in an overlapping area (joint) between adjacent head modules.

In order to inhibit image quality degradation in the overlapping area of the head modules in the single-pass ink-jet recording apparatus, a technique has been proposed in which ink ejection from corresponding upstream and downstream nozzles (ejection holes) of two adjacent head modules is proportionally divided with a predetermined ratio in the overlapping area, and ink ejected from the two nozzles is mixed to form dots.

JP 2007-152582 A describes a technique in which, for corresponding upstream and downstream nozzles of two head modules adjacent via an overlapping area, a mixing ratio (duty ratio) of ejection is changed depending on whether a recording image is a text image, or a graphic image or a halftone image (such as a photograph).

Meanwhile, as shown in FIGS. 13 and 14, head modules 150A and 150B included in a line head 150 is formed by stacking, instead of a single array, a plurality arrays each arranged with a plurality of nozzles in one row, and arranging a plurality of nozzle rows in parallel with a predetermined distance.

In the line head 150 including such head modules 150A and 150B, as shown in FIGS. 13 and 14, a distance between upstream and downstream nozzles 151$a$ and 151$b$ and between upstream and downstream nozzles 152$a$ and 152$b$ corresponding in an overlapping area differs depending on design conditions of the head modules 150A and 150B and is not constant.

In each of the upstream and downstream nozzles of the two head modules as in the above as well, any one of the plurality of nozzle rows having different positions in a moving direction of a recording medium is used, which causes a difference in a time from ejection to curing of ink.

In this case, even if a mixing ratio of ejection of the upstream and downstream nozzles is made equal, characteristics after curing of the ink may differ depending on a nozzle position to cause image incongruity such as a gloss difference and a streak, and uniform image quality may not be obtained over the entire overlapping area.

SUMMARY

Therefore, one or more embodiments of the present invention provide an ink-jet recording apparatus, an ink-jet recording method, and an ink-jet recording program capable of using a line head arranged with a plurality of head modules to inhibit image quality degradation (reduce image incongruity such as a gloss difference and a streak) in an overlapping area (joint) between adjacent head modules.

Furthermore, other advantageous effects of the present invention will become clear by the following description.

According to one or more embodiments of the present invention, an ink-jet recording apparatus comprises: a plurality of head modules each having a plurality of nozzles arranged in a row; a transporter that relatively moves the plurality of head modules and a recording medium in a direction intersecting with an arrangement direction of the plurality of nozzles; a recording controller that causes the plurality of nozzles to eject ink onto a recording medium to form a dot based on image data; and a memory that stores arrangement position information indicating individual positional deviations of the plurality of nozzles in a relative movement direction between the plurality of head modules and the recording medium, wherein the plurality of head modules are arranged in an arrangement direction of the nozzles to have an overlapping area overlapping with an adjacent head module in the relative movement direction, to form a line head, there are upstream and downstream nozzles corresponding to two adjacent head modules in the overlapping area, the transporter causes a same point of the recording medium to pass through a position where ejection of the corresponding upstream and downstream nozzles is performed, to allow a dot to be formed by ejection from the upstream and downstream nozzles, and the recording controller determines a mixing ratio based on arrangement position information stored in the memory, and causes a dot to be formed by mixing ejection from the corresponding upstream and downstream nozzles in accordance with the mixing ratio.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Figure 1:
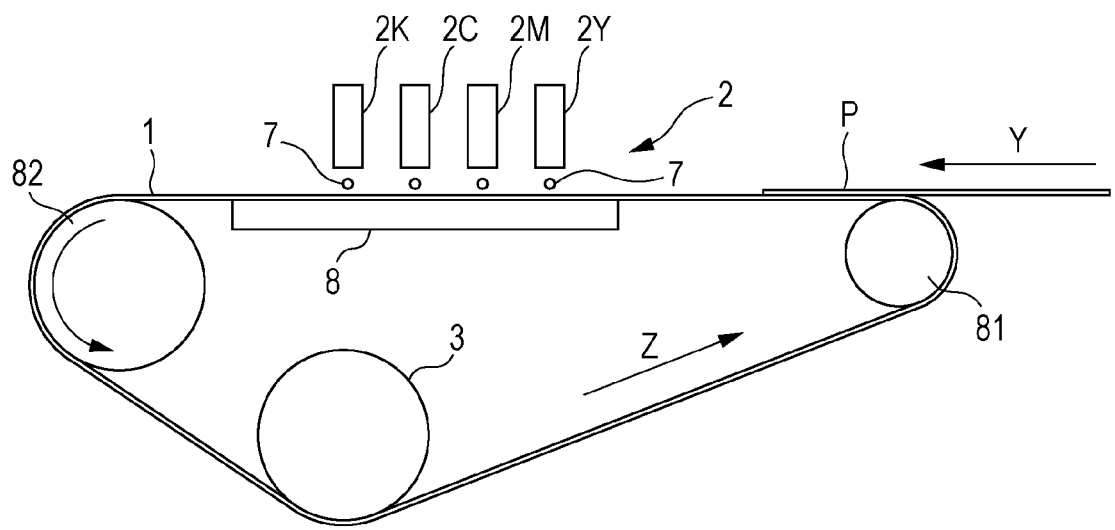
FIG. 1 is a schematic view showing an ink-jet recording apparatus according to one or more embodiments.

Hereinafter, an ink-jet recording apparatus according to one or more embodiments of the present invention will be described with reference to the drawings. However, the scope of the invention is not limited to the disclosed embodiments. An ink-jet recording method according to one or more embodiments of the present invention is embodied as an operation of this ink-jet recording apparatus, and implemented by this ink-jet recording apparatus executing an ink-jet recording program according to one or more embodiments of the present invention. However, the scope of the invention is not limited to the illustrated examples. In the following description, parts having a same function and a configuration are denoted by same reference numerals, and description thereof may be omitted.

[Configuration of Ink-Jet Recording Apparatus]

FIG. 1 is a schematic view showing an ink-jet recording apparatus according to one or more embodiments.

As shown in FIG. 1, the ink-jet recording apparatus has an endless-belt-shaped conveyance belt 1 stretched between rollers 81 and 82, and includes a transporter that conveys a recording medium P by the conveyance belt 1.

In addition, this ink-jet recording apparatus includes an ink-jet head 2Y for yellow ink, an ink-jet head 2M for magenta ink, an ink-jet head 2C for cyan ink, and an ink-jet head 2K for black ink (hereinafter may be collectively referred to as "ink-jet head 2") that form an image by ejecting ink 7 on the basis of image data and forming dots on a surface of the recording medium P. In this ink-jet recording apparatus, the ink 7 is ejected from the ink-jet head 2 on the basis of image data, and an ink image is formed on a surface of the recording medium P.

Note that the number of ink-jet heads and the number of colors are not limited at all. Further, the ink-jet head 2 can use a conventionally known method such as an on-demand method or a continuous method. In addition, examples of an ejection method include, for example, an electro-mechanical conversion method such as a single cavity type, a double cavity type, a bender type, a piston type, a shear mode type, and a shared wall type; an electric-heat conversion method such as a thermal inkjet type and a bubble jet (registered trademark) type; and an electrostatic suction method such as a spark jet type.

The ink 7 used in the ink-jet recording apparatus is obtained by dispersing a pigment in a liquid medium, and may be mixed with a conventionally known additive such as a surfactant or a dispersant, if necessary. Both an aqueous medium and an oily medium can be used as the liquid medium.

Further, phase-change ink and ultraviolet (UV) curable ink may also be used. The phase-change ink is ink that undergoes a phase change in accordance with a temperature of the recording medium P after impact on the recording medium P, to increase the viscosity. Furthermore, a pretreatment material may be applied to the recording medium P, and two-liquid reaction ink that undergoes a phase change by a reaction with the pretreatment material can also be used.

The pigment may be a color material, or may be a microcapsule or the like containing a color material. A particle size of the pigment may be, for example, in a range of 50 nm to 200 nm. A content of the pigment in the ink may be, for example, in a range of 0.1% by mass to 15% by mass, and in a range of 0.5% by mass to 12% by mass.

The conveyance belt 1 is subjected to feed operation between the rollers 81 and 82 and a tension roller 3 as indicated by an arrow Z. The conveyance belt 1 moves the recording medium P placed on an outer surface, relatively to the ink-jet head 2 as indicated by an arrow Y. On an inner surface of the conveyance belt 1, a suction plate 8 is arranged at a position opposed to the ink-jet head 2. The suction plate 8 sucks the recording medium P and the conveyance belt 1 to bring the recording medium P and the conveyance belt 1 into close contact. The recording medium P is brought into close contact with the conveyance belt 1 and supported by the suction plate 8, and is subjected to moving operation with respect to the ink-jet head 2 while maintaining flatness. Note that the suction plate 8 may not be provided unless it is necessary to maintain the flatness of the recording medium P.

In one or more embodiments, the recording medium P is conveyed by the conveyance belt 1, and the ink-jet head 2 and the recording medium P are relatively moved. However, the ink-jet head 2 and the recording medium P may be relatively moved through moving operation on the ink-jet head 2, or through moving operation on the ink-jet head 2 and the recording medium P. Hereinafter, a relative movement direction between the ink-jet head 2 and the recording medium P is referred to as "direction Y".

Figure 2:
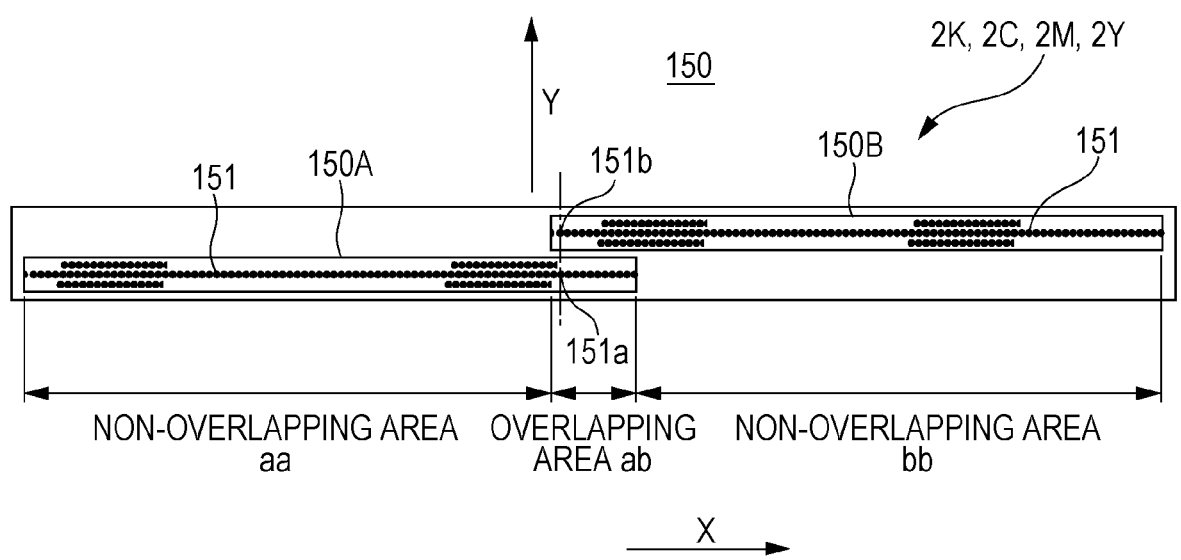
FIG. 2 is a schematic view showing a main part of a line head of the ink-jet recording apparatus according to one or more embodiments.

FIG. 2 is a schematic view showing a main part of a line head of the ink-jet recording apparatus according to one or more embodiments.

Each of the ink-jet heads 2Y, 2M, 2C, and 2K for each color is a line head as shown in FIG. 1. As shown in FIG. 2, in each line head 150, a plurality of short head modules 150A and 150B are arranged. Each head module has a plurality of nozzles 151 arranged in a row. Each of the head modules 150A and 150B ejects the ink 7 from each of the nozzles 151 toward the recording medium P. The head modules 150A and 150B each are arranged in zigzag in an arrangement direction of the nozzles 151 (hereinafter, referred to as "direction X"), and the head modules 150A and 150B each have, at an end in the direction X, an overlapping area ab overlapping in the direction Y with an adjacent head module. In one or more embodiments, each of the two adjacent head modules 150A and 150B has the plurality of nozzles 151 in the overlapping area ab. The arrangement direction (direction X) of the nozzles 151 is a direction orthogonal to the direction Y.

As for each of the head modules 150A and 150B, the number of pieces required for at least the entire width of the recording medium P (a width in the direction X) are arranged over the entire width of the recording medium P. The line head 150 includes, for example, eight head modules, but the number of head modules 150A and 150B is not limited at all.

Figure 13:
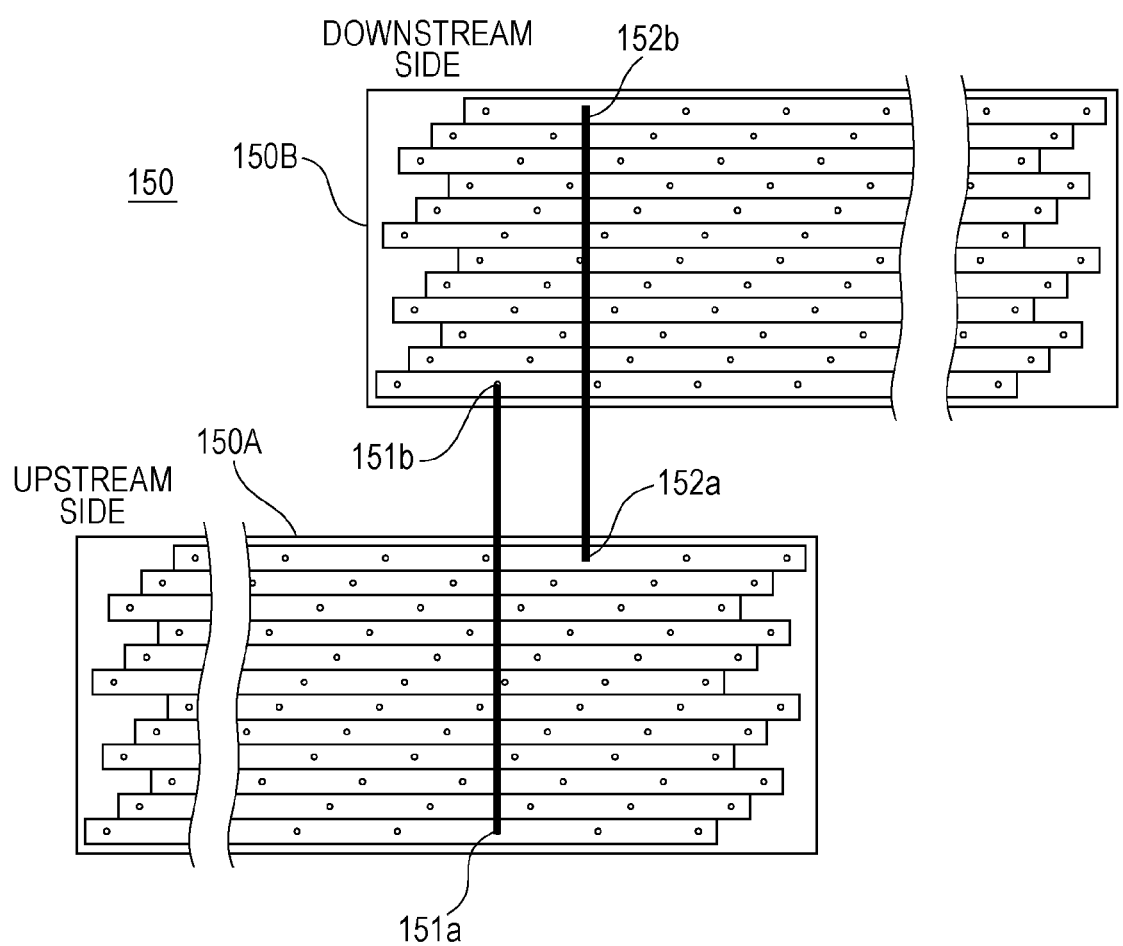
FIG. 13 is a schematic view showing a main part of a line head.
Figure 14:
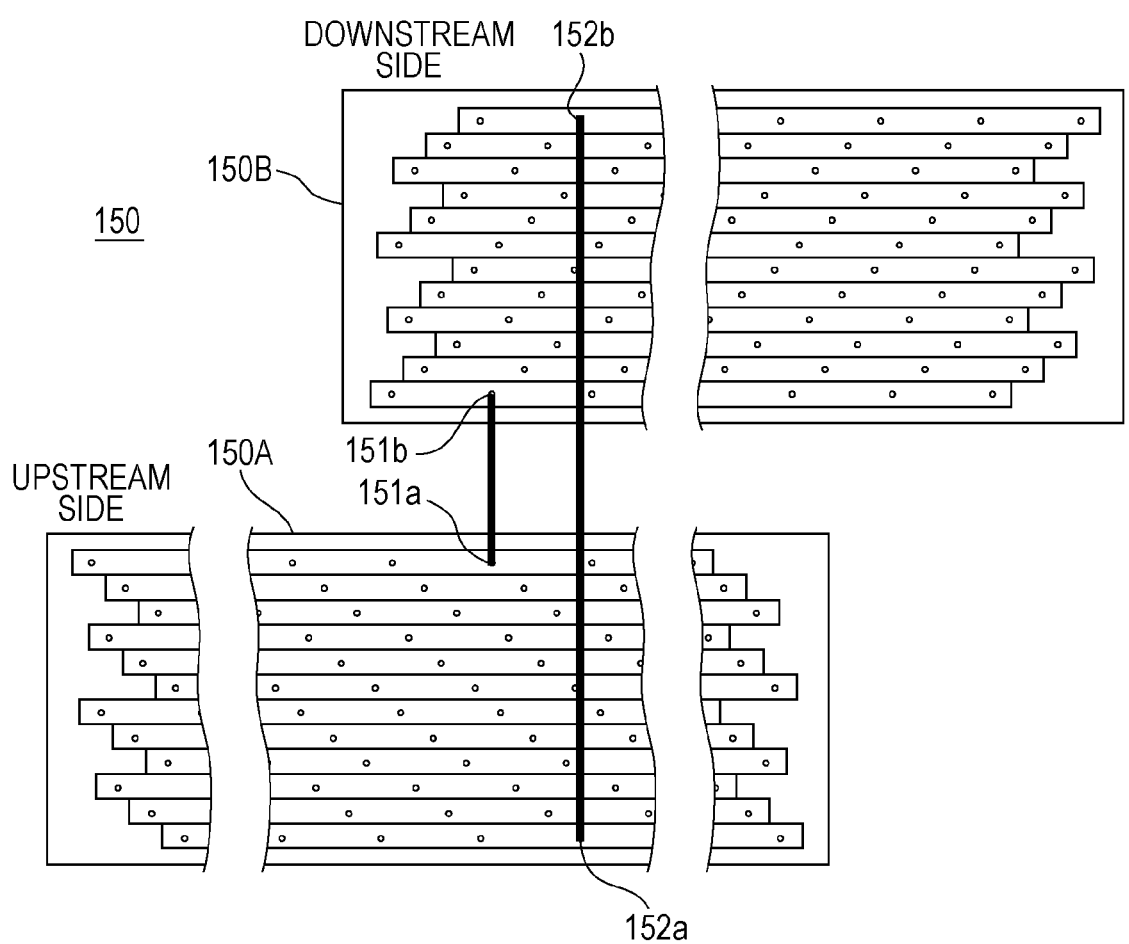
FIG. 14 is a schematic view showing another example of the main part of the line head.

As described above with reference to FIGS. 13 and 14, the head modules 150A and 150B included in the line head 150 is formed by stacking a plurality of arrays each arranged with a plurality of nozzles in one row, and arranging a plurality of nozzle rows in parallel with a predetermined distance. The head modules 150A and 150B each are formed as a head module of 1200 dpi, for example, by arranging, in parallel in the direction Y, 12 nozzle rows arranged shifted in the direction X, for example. However, the number of nozzle rows and dot density are not limited at all.

The recording medium P and the line head 150 are relatively moved by the transporter in the direction Y intersecting with the arrangement direction (direction X) of the nozzles 151 in the line head 150, as shown by the arrow Y in FIG. 2. In the overlapping area ab, the transporter causes a same point of the recording medium P to pass through a position where ejection is performed from the corresponding upstream and downstream nozzles 151a and 151b of the two head modules 150A and 150B that are adjacent via the overlapping area ab, to cause dots to be formed by ejection from the upstream and downstream nozzles 151a and 151b.

Figure 3:
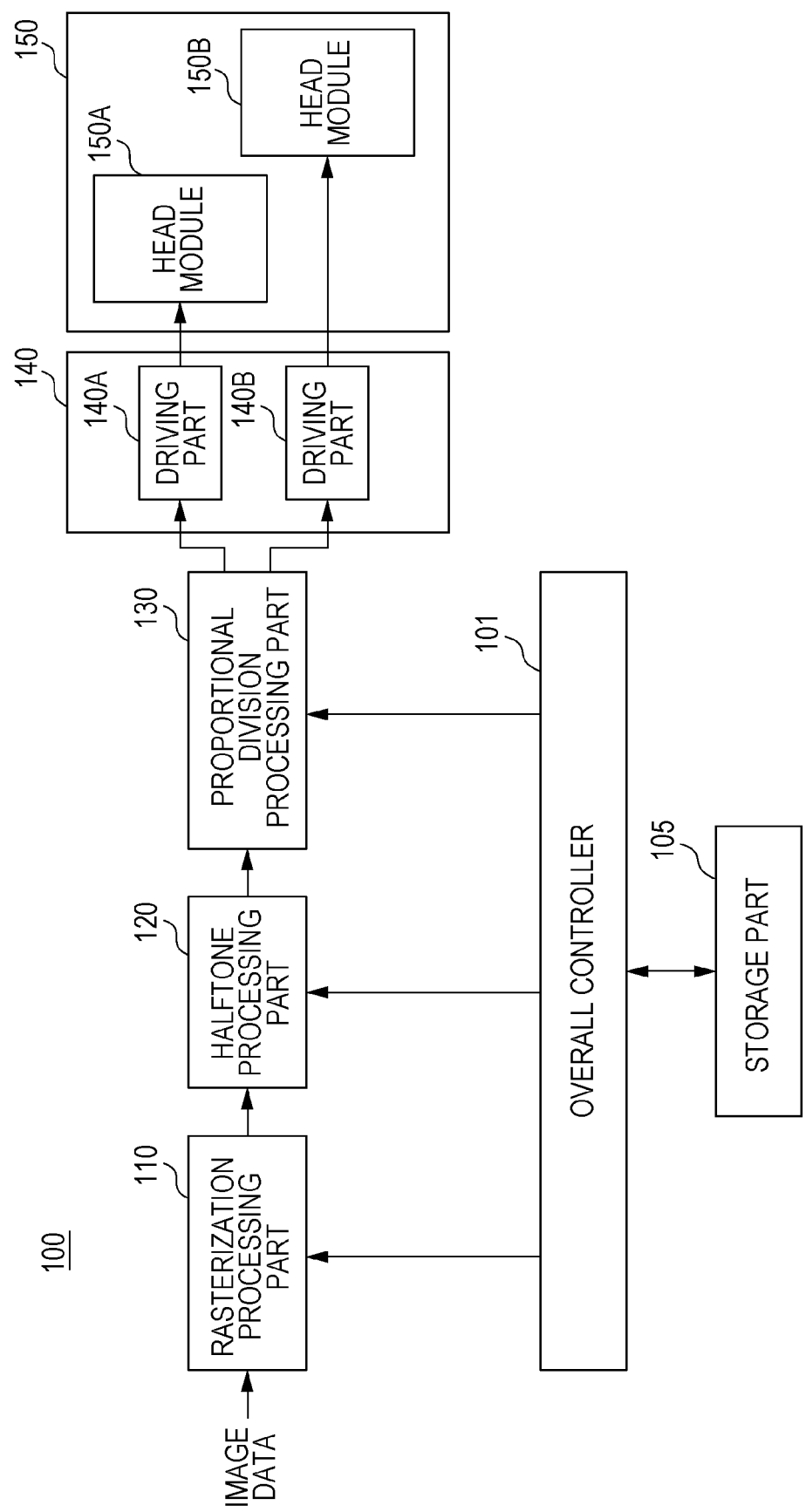
FIG. 3 is a block diagram showing a recording control device of the ink-jet recording apparatus of one or more embodiments.

FIG. 3 is a block diagram showing a recording control device of the ink-jet recording apparatus according to one or more embodiments.

As shown in FIG. 3, the ink-jet recording apparatus includes a recording control device 100 serving as a recording controller. The recording control device 100 includes a rasterization processing part 110, a halftone processing part 120, and a proportional division processing part 130, which are controlled by an overall controller 101. The overall controller 101 is connected with a storage part 105 that stores an ink-jet recording program and other information. In addition, the storage part 105 stores arrangement position information indicating individual positional deviations of the plurality of nozzles 151 in the relative movement direction Y between the ink-jet head 2 and the recording medium P. The ink-jet recording method embodied as an operation of the recording control device 100 is implemented by the overall controller 101 executing the ink-jet recording program.

To the recording control device 100, image data is inputted. The recording control device 100 controls ejection operation on the recording medium P by the plurality of head modules 150A and 150B on the basis of the image data, and, in the overlapping area ab, causes complementary ejection operation to be performed by the corresponding upstream and downstream nozzles 151a and 151b of the two head modules 150A and 150B adjacent via the overlapping area ab.

The image data inputted to the recording control device 100 is converted into bitmap data in the rasterization processing part 110, and sent to the halftone processing part 120. The halftone processing part 120 generates dot data from the bitmap data, and sends the dot data to the proportional division processing part 130. The proportional division processing part 130 determines a mixing ratio of the adjacent head modules 150A and 150B (i.e., ink mixing ratio between ink ejected from the adjacent head module 150A and ink ejected from the adjacent head module 150B) in the overlapping area ab on the basis of the arrangement position information stored in the storage part 105 for a same color ink. Note that the determination of the mixing ratio is not required to be performed as an independent pre-processing, the number of ink droplets to be ejected by the upstream and downstream nozzles 151a and 151b may be directly determined, and it suffices that the determination result of the number of ejected ink droplets matches the mixing ratio.

The proportional division processing part 130 proportionally divides a frequency of the ejection operation of the corresponding upstream and downstream nozzles 151a and 151b of the two adjacent head modules 150A and 150B in the overlapping area ab, in accordance with the mixing ratio. When ink droplets ejected from the corresponding upstream and downstream nozzles 151a and 151b impact on an adjacent position where ejection is possible, the ink droplets are spread and connected to form dots and solidify. For example, the upstream nozzle 151a performs the ejection operation with a mixing ratio of 20% and the downstream nozzle 151b with a mixing ratio of 80% (a total of 100%), the upstream nozzle 151a performs the ejection operation with a mixing ratio of 40% and the downstream nozzle 151b with a mixing ratio of 60% (a total of 100%), the upstream nozzle 151a performs the ejection operation with a mixing ratio of 70% and the downstream nozzle 151b with a mixing ratio of 30% (a total of 100%), or the like. This proportional division process is performed for each color ink. Note that the proportional division process may be performed not on the number of ejected ink droplets (ejection frequency) but on an amount of ejected ink (size of ink droplets). Further, the proportional division process may be performed on both the number of ink droplets and the amount of ink.

The dot data proportionally divided by the proportional division processing part 130 is sent to a driving part 140A that drives the upstream head module 150A and a driving part 140B that drives the downstream head module 150B. The upstream driving part 140A drives the upstream head module 150A, and the downstream driving part 140B drives the downstream head module 150B. Note that the recording control device 100 also controls the feed operation of the conveyance belt 1.

Figure 4:
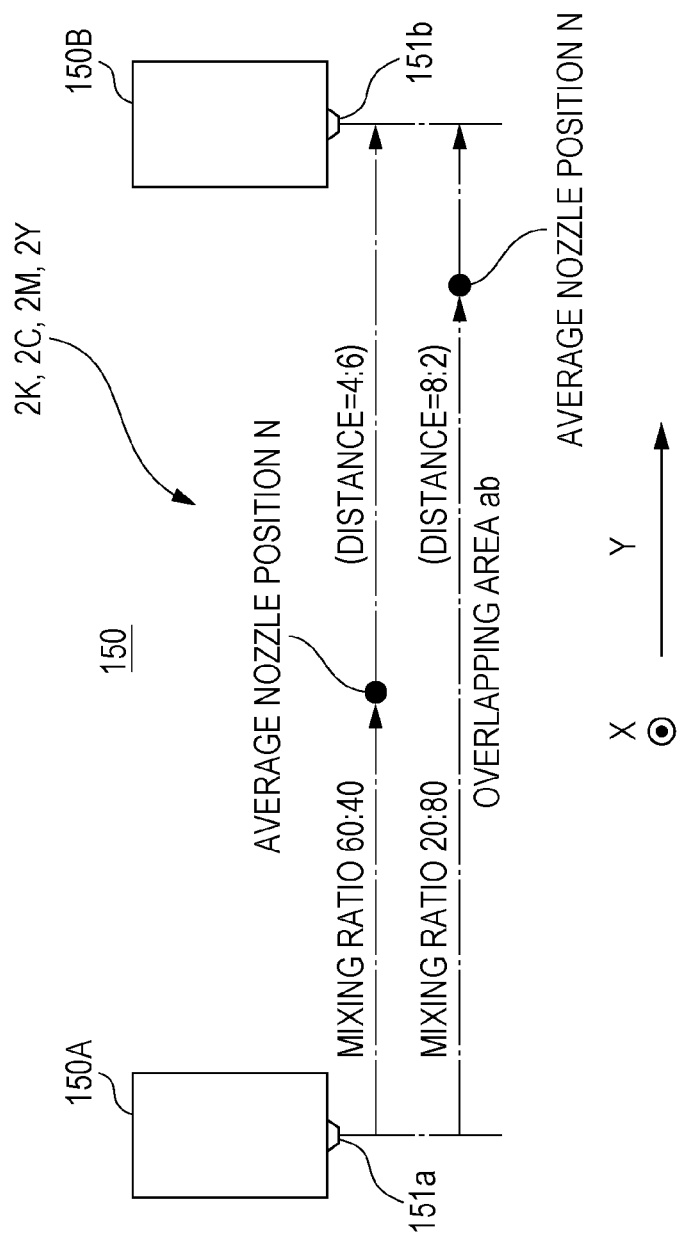
FIG. 4 is a schematic view showing an average nozzle position.

FIG. 4 is a schematic view showing an average nozzle position.

As shown in FIG. 4, an average nozzle position N is a position obtained by proportionally dividing, in accordance with the mixing ratio, a distance between the upstream and downstream nozzles 151a and 151b corresponding in the overlapping area ab of the two adjacent head modules 150A and 150B. When the mixing ratio is 60% for the upstream nozzle 151a and 40% for the downstream nozzle 151b, the average nozzle position N is a point at 40% of the distance from the upstream nozzle 151a to the downstream nozzle 151b. Further, when the mixing ratio is 20% for the upstream nozzle 151a and 80% for the downstream nozzle 151b, the average nozzle position N is a point at 80% of the distance from the upstream nozzle 151a to the downstream nozzle 151b.

Figure 5:
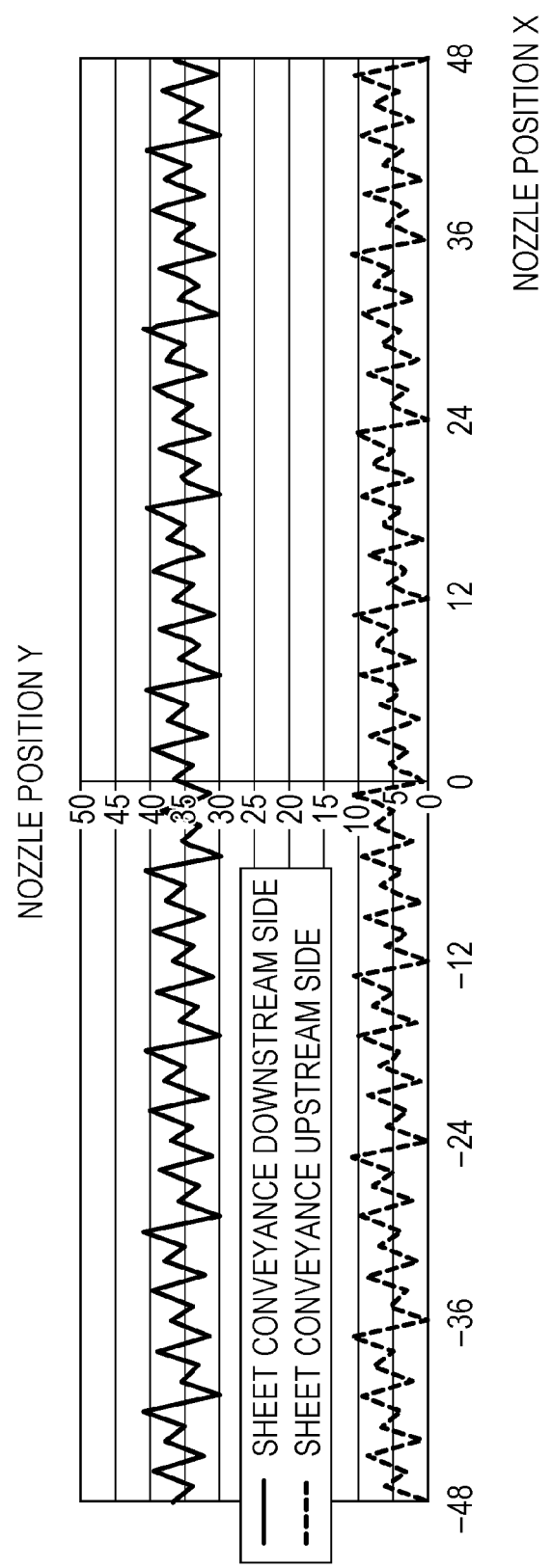
FIG. 5 is a view showing a relationship of a position in an orthogonal direction (direction Y) with respect to an arrangement direction (direction X) of each nozzle in an overlapping area of the line head shown in FIG. 2.

FIG. 5 is a graph showing a relationship of a position in the orthogonal direction (direction Y) with respect to a position in the arrangement direction (direction X) of each nozzle in the overlapping area of the line head shown in FIG. 2.

In the direction Y orthogonal to the arrangement direction (direction X) of each nozzle 151, a position of each nozzle 151 changes at a period corresponding to the number of nozzle rows, as shown in FIG. 5. In FIG. 5, a horizontal axis indicates the number of dots (the number of nozzles) in the direction X, and a vertical axis indicates a position in the direction Y in units of dot pitch.

Such a position of each nozzle 151 varies depending on a configuration of the head module to be adopted. That is, a relationship between a position in the direction X and a position in the direction Y of each nozzle 151 depends on a layout design of the head module. The relationship is also affected by position adjustment of each head module.

The position of each nozzle 151 in the direction Y affects a quality of a recording image in the overlapping area, in addition to characteristics of the ink and a conveyance speed of the recording medium P. For example, in an ink-jet recording apparatus that sequentially ejects ink of four colors and then cures the ink by ultraviolet (UV) irradiation, a variation in a time from impact on the recording medium P to the curing of the ink causes an influence such as occurrence of image incongruity such as a gloss difference and a streak.

[Operation of Ink-Jet Recording Apparatus (Ink-Jet Recording Method and Ink-Jet Recording Program)]

Figure 6:
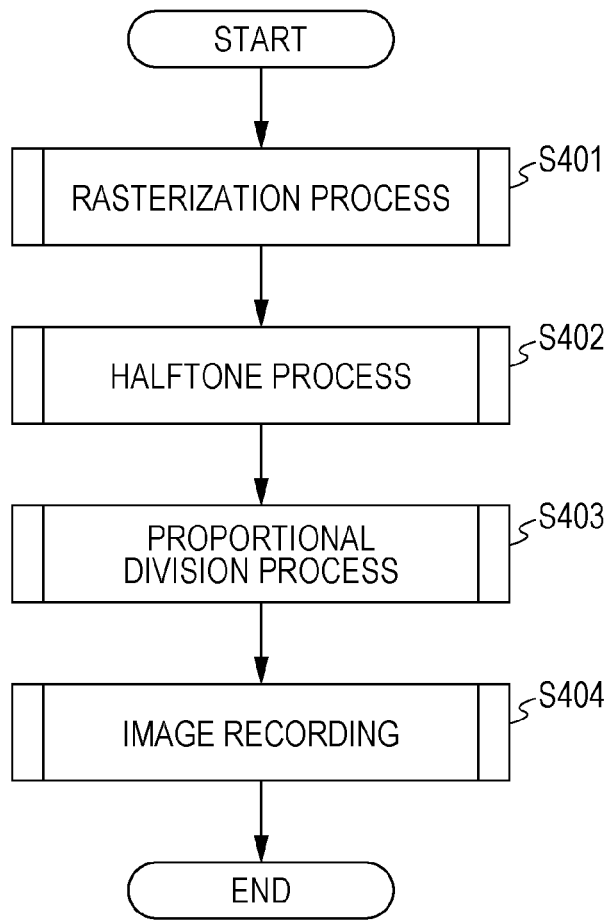
FIG. 6 is a flowchart showing an ink-jet recording program according to one or more embodiments.

FIG. 6 is a flowchart showing an ink-jet recording program according to one or more embodiments.

As shown in FIG. 6, in the recording control device 100, when the overall controller 101 starts the ink-jet recording program, the process proceeds to S401, and the rasterization processing part 110 executes a rasterization process. Next, the process proceeds to S402, and the halftone processing part 120 executes a halftone process. Next, the process proceeds to S403, and the proportional division processing part 130 executes a proportional division process. Then, the process proceeds to S404, and image recording, that is, conveyance of the recording medium P and ink ejection from the line head 150 are performed, and the ink-jet recording program is terminated (end).

The ink-jet recording apparatus according to one or more embodiments has been proposed for the purpose of eliminating image incongruity such as a gloss difference and a streak in the overlapping area ab of the head modules 150A and 150B. This ink-jet recording apparatus has a feature of the proportional division process by the proportional division processing part 130. First, a cause of the image incongruity will be described with reference to FIGS. 7 to 9 below.

Figure 7:
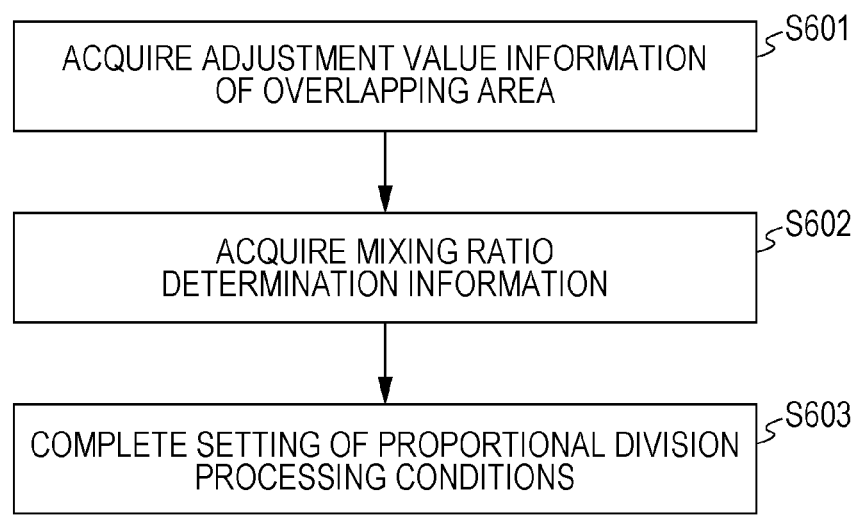
FIG. 7 is a flowchart showing a proportional division process by the recording control device (arrangement position information of nozzles in the direction Y is not considered)

FIG. 7 is a flowchart showing the proportional division process by the recording control device (arrangement position information of nozzles in the direction Y is not considered).

In determining the mixing ratio in the proportional division processing part 130, when the arrangement position information of nozzles in the direction Y is not considered, as shown in FIG. 7, the proportional division processing part 130 acquires adjustment value information regarding the overlapping area ab in S601. The adjustment value information is information such as a length of the overlapping area ab (the number of dots in the direction X). Next, in S602, the proportional division processing part 130 determines a mixing ratio. Here, without considering the arrangement position information of nozzles, the mixing ratio is determined as a monotonically increasing amount at a constant percentage, by setting, as [X=0], a position determined separately, or a center point of the overlapping area ab set by initial adjustment of the ink-jet recording apparatus. Therefore, here, determination information for the mixing ratio is a distance alone in the direction X in the overlapping area ab. Note that, as described above, the determination of the mixing ratio is not required to be performed as an independent step, the number of ink droplets to be ejected by the upstream and downstream nozzles 151a and 151b may be directly determined, and it suffices that the determination result of the number of ejected ink droplets matches the mixing ratio. Next, in S603, the proportional division processing part 130 completes the setting of proportional division process conditions.

Figure 8:
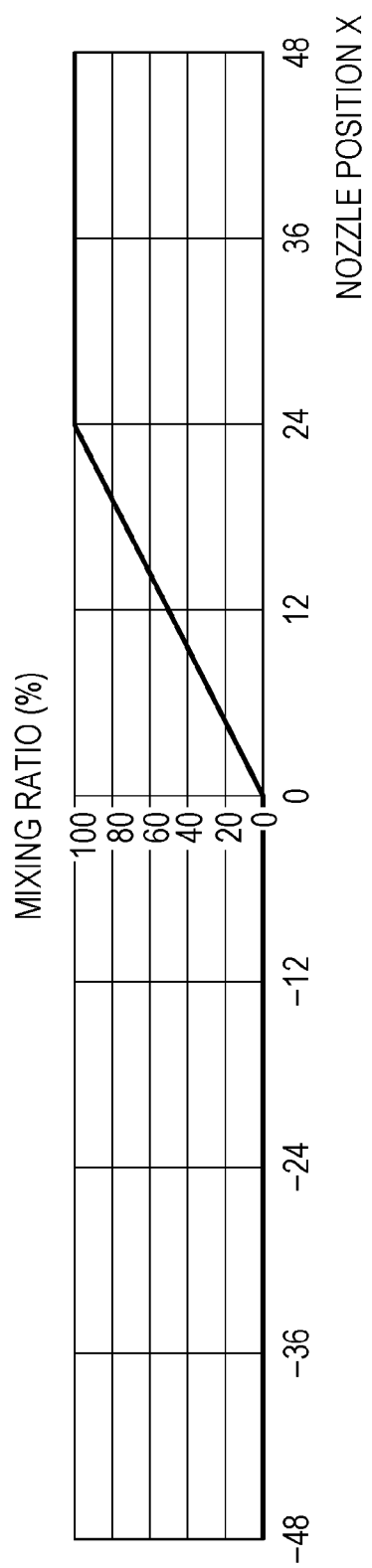
FIG. 8 is a graph showing a setting example of a mixing ratio (arrangement position information of nozzles in the direction Y is not considered)

FIG. 8 is a graph showing a setting example of a mixing ratio (arrangement position information of nozzles in the direction Y is not considered).

When the mixing ratio is determined in this manner, as shown in FIG. 8, a mixing ratio is determined in which the number of ink droplets ejected from the upstream nozzle 151a increases at a constant percentage from 0% to 100% in the overlapping area ab (nozzle positions 0 to 24 in the direction X). Although not shown, the number of ink droplets ejected from the downstream nozzle 151b is of a mixing ratio that decreases at a constant percentage from 100% to 0%.

Figure 9:
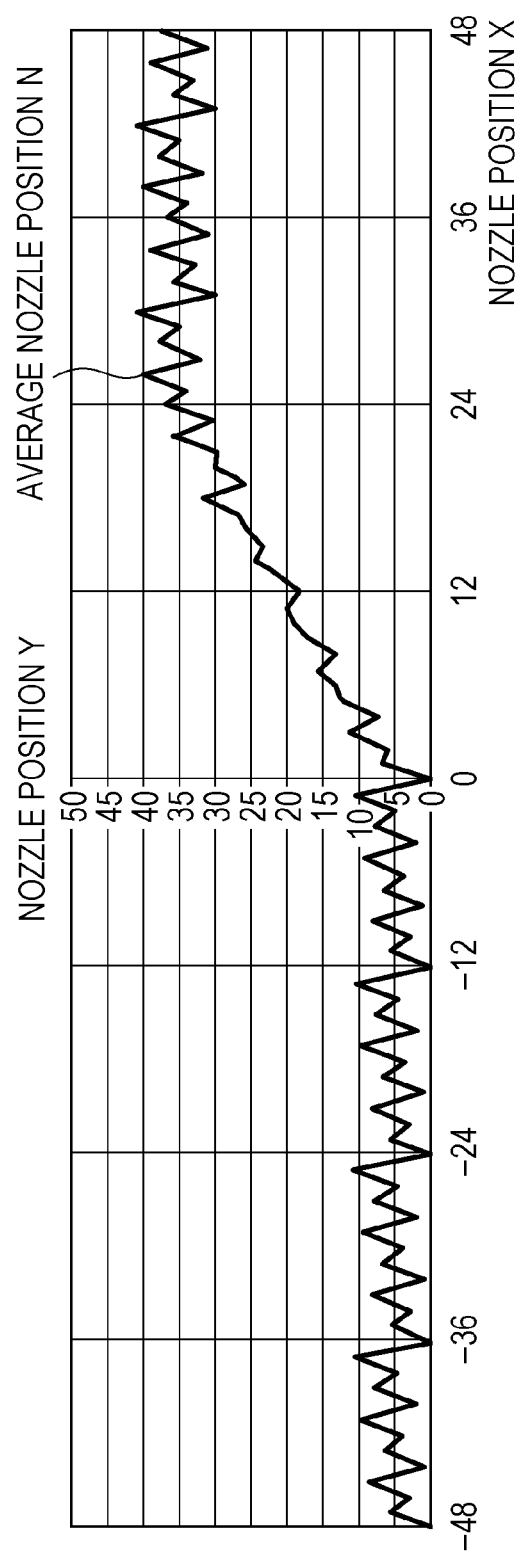
FIG. 9 is a graph showing a relationship of an average nozzle position (direction Y) with respect to a position in an arrangement direction (direction X) of each nozzle after the proportional division process in settings of FIGS. 5 and 8.

FIG. 9 is a graph showing a relationship of an average nozzle position (direction Y) with respect to a position of each nozzle in the arrangement direction (direction X) after the proportional division process in the settings of FIGS. 5 and 8.

When the nozzle position (direction Y) is changing at a period corresponding to the number of nozzle rows, as shown in FIG. 5, the average nozzle position N in the overlapping area ab is to be an arrangement reflecting a periodic change in the nozzle position (direction Y) as shown in FIG. 9, when a mixing ratio that changes at a constant percentage is set as shown in FIG. 8. At an inflection point or the like in the arrangement of the average nozzle position N, visibility of a gloss difference or a streak in a recording image is not to be smooth, but to cause incongruity.

As described with reference to FIGS. 10 and 12 below, this ink-jet recording apparatus is to set the average nozzle position N to be in a predetermined arrangement state while considering the arrangement position information of nozzles without setting the mixing ratio that changes at a constant percentage as shown in FIG. 8, in order to avoid an influence of a time difference from impact on the recording medium P to curing, and realize a good image connection.

Note that, the average nozzle position N may also be determined as a ratio using a time as a parameter such that a time averaged by proportionally dividing the time from impact on the recording medium P to curing of the ink ejected from the corresponding upstream and downstream nozzles 151a and 151b in accordance with the mixing ratio becomes a predetermined time.

Figure 10:
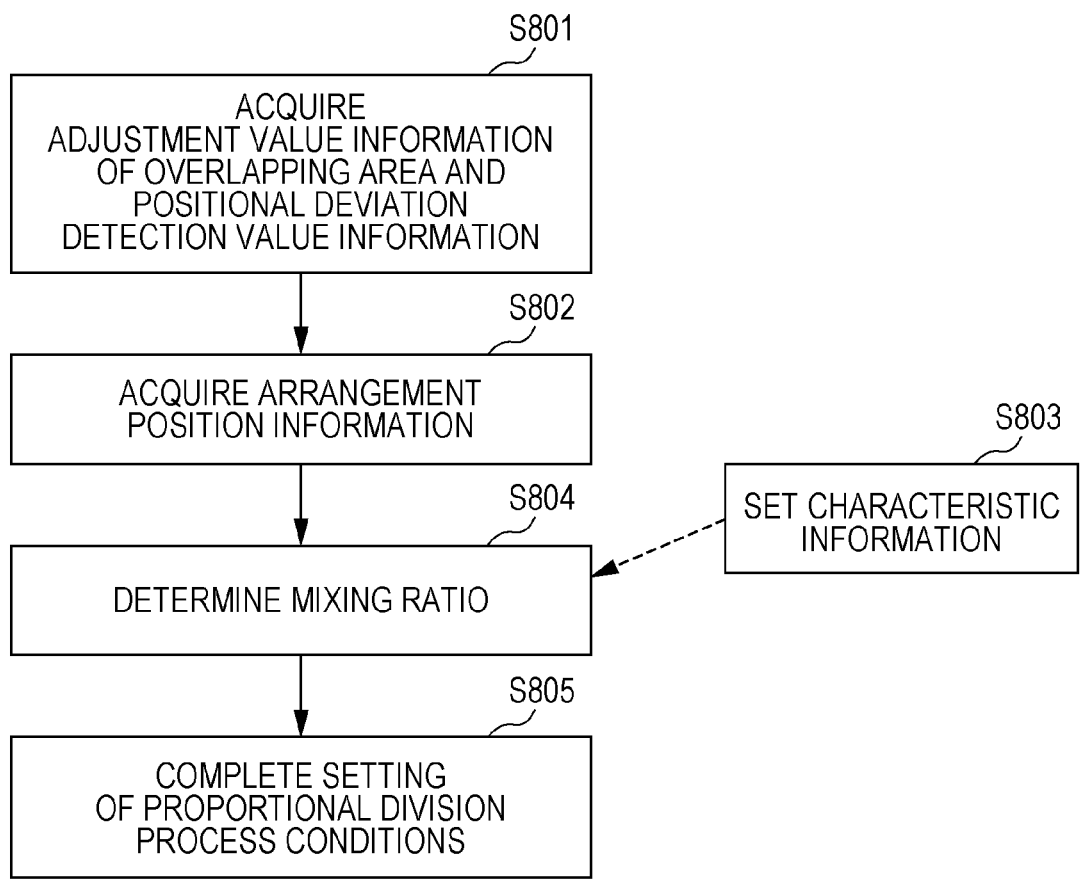
FIG. 10 is a flowchart showing the proportional division process by the recording control device (arrangement position information of nozzles in the direction Y is considered)

FIG. 10 is a flowchart showing the proportional division process by the recording control device (arrangement position information of nozzles in the direction Y is considered).

When considering the arrangement position information of nozzles in the direction Y, as shown in FIG. 10, in S801, the proportional division processing part 130 acquires adjustment value information regarding the overlapping area ab and positional deviation information of the head modules 150A and 150B. The adjustment value information is information such as a length of the overlapping area ab (the number of dots in the direction X). The positional deviation information of the head modules 150A and 150B is a measured value of an actual positional deviation from a designed position when the head modules 150A and 150B are attached. Next, in S802, the proportional division processing part 130 acquires arrangement position information indicating individual positional deviations (direction Y) of the plurality of nozzles. The arrangement position information is acquired from the storage part 105. Next, in step S803, the proportional division processing part 130 sets (acquires) characteristic information of the nozzle and the ink. Next, in S804, the proportional division processing part 130 determines a mixing ratio. Here, in consideration of the arrangement position information of nozzles, the mixing ratio is determined as the number of ink droplets reflecting a periodic change of each nozzle position (direction Y). Next, in S805, the proportional division processing part 130 completes the setting of proportional division process conditions.

Figure 11:
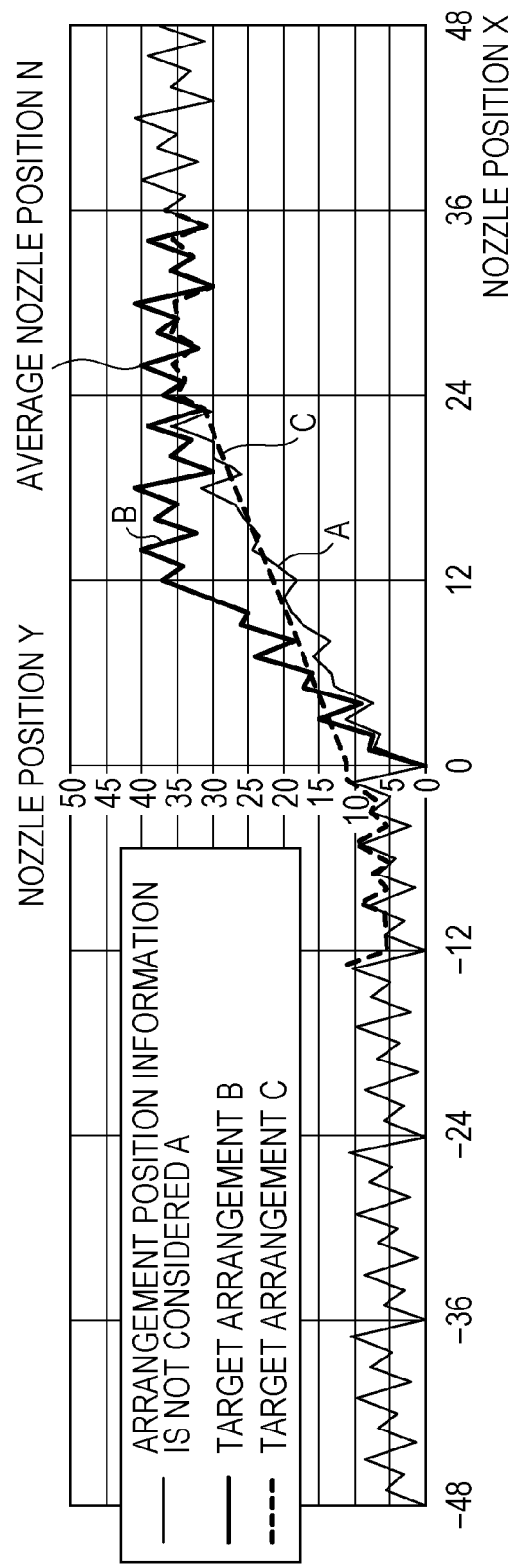
FIG. 11 is a graph showing a relationship of an average nozzle position (direction Y) with respect to a position of each nozzle in the arrangement direction (direction X) after the proportional division process.

FIG. 11 is a graph showing a relationship of an average nozzle position (direction Y) with respect to a position of each nozzle in the arrangement direction (direction X) after the proportional division process.

The relationship of the average nozzle position N (direction Y) with respect to the position in the arrangement direction (direction X) of each nozzle after the proportional division process, which has been an arrangement A reflecting a periodic change in the nozzle position (direction Y) as shown in FIG. 11, becomes target arrangements (predetermined arrangements) B and C. Although the target arrangement B reflects a periodic change in the nozzle position (direction Y), the target arrangement B is to be shifted to an arrangement of the average nozzle position N closer to the nozzle arrangement of the downstream head module 150B sooner. In the target arrangement B, periodicity in units of 12 dots is maintained to some extent, and a length (direction X) of the overlapping area ab is set to be slightly narrow, so that it is possible to reduce incongruity of an image quality in the overlapping area ab.

The target arrangement C is obtained by linearly arranging the average nozzle position N.

The target arrangement C is an arrangement in which inclination of the arrangement of the average nozzle position N is made linear (flat), the inclination is slightly laid down, and a periodic change in the nozzle position (direction Y) is reduced in the vicinity of connection with non-overlapping areas a and b, to allow smooth connection to the non-overlapping areas a and b.

The arrangements of the average nozzle position N can be determined and set as appropriate from a system configuration and quality of the ink-jet recording apparatus, and may be set more flexibly (in consideration of more characteristic information).

Figure 12:
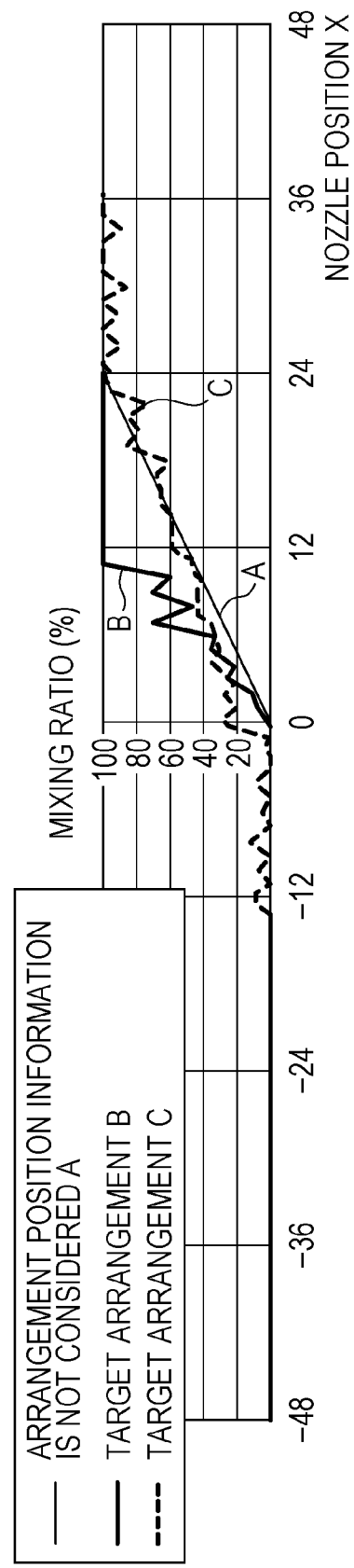
FIG. 12 is a graph showing a setting example of a mixing ratio in the proportional division process shown in FIG. 11.

FIG. 12 is a graph showing a setting example of a mixing ratio in the proportional division process shown in FIG. 11.

In order to realize the arrangements of the average nozzle position N shown in FIG. 11, the mixing ratio is determined and set as shown in FIG. 12. In order to realize the target arrangements B and C, the mixing ratio can be obtained by calculating backward from the target average nozzle position N and the position (direction Y) of the corresponding upstream and downstream nozzles 151a and 151b.

Further, depending on conditions such as characteristics of the nozzles 151 and the ink, attribute tag information of a recording image (attribute information such as a character, a figure, or a photo), and a printing speed (a relative moving speed between the recording medium P and the head modules 150A and 150B), the proportional division process shown in FIG. 7 and the proportional division process shown in FIG. 10 can also be used together in one image if necessary, and one of the proportional division processes can be selected for each image. For example, the proportional division processing part 130 may determine whether to determine the mixing ratio in accordance also with characteristic information of the nozzles 151 and the ink, or to determine the mixing ratio in accordance with the arrangement position information alone.

When the position of the overlapping area ab is adjustable, the proportional division processing part 130 may determine the mixing ratio again after adjusting the position of the overlapping area ab. The adjustment of the position of the overlapping area ab includes both mechanical adjustment (adjustment of the positions of the head modules 150A and 150B) and electrical adjustment through selection of the nozzles 151 for ejection by the proportional division processing part 130. Further, the proportional division processing part 130 can also determine the mixing ratio by adjusting a length (direction X) of the overlapping area ab.

When it is possible to detect a positional deviation of the head modules 150A and 150B, the proportional division processing part 130 may determine again the mixing ratio after detecting a positional deviation of the head modules 150A and 150B.

Furthermore, the proportional division processing part 130 may make the determination by applying to required conditions, such as determining the mixing ratio on the basis of at least any information of edge determination information about the nozzle arrangement direction (direction X) in the recording image, or attribute tag information of the recording image (attribute information such as a character, a graphic, or a photo).

The proportional division processing part 130 may determine whether to determine the mixing ratio in accordance also with a printing speed (a relative moving speed between the recording medium P and the head modules 150A and 150B), or determine the mixing ratio on the basis of the arrangement position information alone.

In the ink-jet recording apparatus, a degree of influence by the characteristic information such as nozzle characteristics differs in accordance with a printing speed and an arrangement (order) of the line heads 150 for individual colors. Therefore, when the printing speed can be changed, whether or not to consider the characteristic information such as nozzle characteristics may be switched depending on the printing speed, as shown in Table 1.

TABLE 1

Example of setting whether to consider characteristic information

| | Distance between impact and curing Short to Long | | | |
|---|---|---|---|---|
| Conditions | Black | Cyan | Magenta | Yellow |
| High-speed print mode | Yes | Yes | Yes | Yes |
| Low-speed print mode | Yes | No | No | No |

For example, in a high-speed print mode, a time from when the ink impacts on the recording medium P to when being cured is short, and a time difference before curing and a degree of influence due to the characteristic information such as nozzle characteristics are large for each color.

Therefore, the mixing ratio of all of black, cyan, magenta, and yellow (in an ascending order of distance to a curing device) may be determined in consideration of the characteristic information. On the other hand, in a low-speed print mode, a time from when the ink impacts on the recording medium P to when being cured is long, and a time difference before curing and a degree of influence due to the characteristic information such as nozzle characteristics are different for each color. Therefore, the mixing ratio is determined in consideration of the characteristic information for black (color with a short distance to the curing device), but consideration of the characteristic information is not required for cyan, magenta, and yellow (colors with a long distance to the curing device).

Note that, in each of the above-described embodiments, description has been given to an example in which the present invention is applied to an ink-jet recording apparatus that forms a color image, but the present invention can be applied to an ink-jet recording apparatus that forms a monochrome image. In addition, the specific configuration, shape, material, operation, numerical value, and the like in the description of each of the above embodiments are merely examples for explaining the present invention, and the present invention must not be interpreted in a limited manner by these.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An ink-jet recording apparatus comprising:
   head modules each comprising nozzles disposed in a row;
   a transporter that moves a recording medium with respect to the head modules in a direction intersecting an arrangement direction of the nozzles;
   a recording controller that causes the nozzles to eject ink onto the recording medium and to form a dot based on image data; and
   a memory that stores arrangement position information indicating individual positional deviations of the nozzles from designed positions of the nozzles in a relative movement direction of the head modules with respect to the recording medium, wherein
   the head modules are disposed in the arrangement direction of the nozzles with an overlapping area in which each of the head modules overlaps with an adjacent head module when viewed in the relative movement direction and form a line head,
   the transporter causes a same point of the recording medium to pass through a position where upstream and downstream nozzles that correspond to two adjacent head modules eject ink, and
   the recording controller:
      determines a mixing ratio between the corresponding upstream and downstream nozzles based on the arrangement position information, and
      causes the dot to be formed by mixing ink ejected from the corresponding upstream and downstream nozzles in accordance with the mixing ratio.

2. The ink-jet recording apparatus according to claim 1, wherein
   a position obtained by proportionally dividing a distance between the corresponding upstream and downstream nozzles with the mixing ratio is set as an average nozzle position, and
   the recording controller determines the mixing ratio such that the average nozzle position is in a predetermined arrangement state in the overlapping area.

3. The ink-jet recording apparatus according to claim 2, wherein
   the predetermined arrangement state of the average nozzle position corresponds to an average time until ink having impacted on the recording medium is cured.

4. The ink-jet recording apparatus according to claim 1, wherein
   a position of the overlapping area is adjustable, and
   the recording controller determines again the mixing ratio after adjusting the position of the overlapping area.

5. The ink-jet recording apparatus according to claim 1, wherein
   the recording controller determines again the mixing ratio after detecting the individual positional deviations of the head modules.

6. The ink-jet recording apparatus according to claim 1, wherein
   the recording controller determines the mixing ratio based on at least one of edge determination information about the arrangement direction of the nozzles in a recording image and attribute tag information of the recording image.

7. The ink-jet recording apparatus according to claim 1, wherein
   the recording controller determines the mixing ratio based on the arrangement position information and characteristic information of the nozzles and the ink.

8. The ink-jet recording apparatus according to claim 1, wherein
   the recording controller determines the mixing ratio based on the arrangement position information and a relative moving speed of the recording medium with respect to the head modules.

9. The ink-jet recording apparatus according to claim 1, wherein
   the recording controller adjusts a length of the overlapping area to determine the mixing ratio.

10. An ink-jet recording method for forming a dot on a recording medium using a line head that comprises head modules each comprising nozzles disposed in a row, where the head modules are disposed in a direction in which the nozzles are disposed, the method comprising:
    moving the recording medium with respect to the line head in a direction intersecting an arrangement direction of the nozzles; and
    ejecting ink from each of the nozzles, wherein
    the head modules are disposed to have an overlapping area overlapping with an adjacent head module in a relative movement direction of the head modules with respect to the recording medium, and, in the overlapping area, a same point of the recording medium passes through a position where upstream and downstream nozzles that correspond to two head modules adjacent via the overlapping area eject ink,
    arrangement position information indicating individual positional deviations of the nozzles from designed positions of the nozzles in the relative movement direction is held,
    a mixing ratio in the overlapping area is determined based on the arrangement position information, and based on image data, the head modules eject ink on the recording medium, and, in the overlapping area, ink ejected from the corresponding upstream and downstream nozzles is mixed in accordance with the mixing ratio, to form a dot.

11. The ink-jet recording method according to claim 10, wherein
when a position obtained by proportionally dividing a distance between the corresponding upstream and downstream nozzles with the mixing ratio is set as an average nozzle position,
the average nozzle position is set to be in a predetermined arrangement state in the overlapping area by determining the mixing ratio.

12. The ink-jet recording method according to claim 11, wherein
the predetermined arrangement state of the average nozzle position corresponds to an average time until ink having impacted on the recording medium is cured.

13. The ink-jet recording method according to claim 10, wherein
the mixing ratio is determined again after a position of the overlapping area is adjusted.

14. The ink-jet recording method according to claim 10, wherein
the mixing ratio is determined again after a positional deviation of the head modules is detected.

15. The ink-jet recording method according to claim 10, wherein
the mixing ratio is determined based on at least one of edge determination information about an arrangement direction of the nozzles in a recording image and attribute tag information of the recording image.

16. The ink-jet recording method according to claim 10, wherein
the mixing ratio is determined based on the arrangement position information and characteristic information of the nozzle and the ink.

17. The ink-jet recording method according to claim 10, wherein
the mixing ratio is determined based on the arrangement position information and a relative moving speed of the recording medium with respect to the head modules.

18. The ink-jet recording method according to claim 10, wherein
a length of the overlapping area is adjusted, and the mixing ratio is determined.

19. A non-transitory recording medium storing a computer readable ink-jet recording program for forming a dot on a recording medium, where a line head is disposed with head modules each comprising nozzles disposed in a row, the line head is disposed in a direction in which the nozzles are disposed, the recording medium is moved with respect to the line head in a direction intersecting with an arrangement direction of the nozzles, and ink is ejected from each of the nozzles, wherein
the head modules are disposed to have an overlapping area overlapping with an adjacent head module in a relative movement direction of the head modules with respect to the recording medium, and, in the overlapping area, a same point of the recording medium passes through a position where upstream and downstream nozzles that correspond to two head modules adjacent via the overlapping area eject ink,
arrangement position information indicating individual positional deviations of the nozzles from designed positions of the nozzles in the relative movement direction is held,
a mixing ratio in the overlapping area is determined based on the arrangement position information, and
based on image data, the head modules eject ink on the recording medium, and, in the overlapping area, ink ejected from the corresponding upstream and downstream nozzles is mixed in accordance with the mixing ratio, to form a dot.

20. The non-transitory recording medium according to claim 19, wherein
when a position obtained by proportionally dividing a distance between the corresponding upstream and downstream nozzles with the mixing ratio is set as an average nozzle position,
the average nozzle position is set to be in a predetermined arrangement state in the overlapping area by determining the mixing ratio.

21. The non-transitory recording medium according to claim 20, wherein
the predetermined arrangement state of the average nozzle position corresponds to an average time until ink having impacted on the recording medium is cured.

22. The non-transitory recording medium according to claim 19, wherein
the mixing ratio is determined again after a position of the overlapping area is adjusted.

23. The non-transitory recording medium according to claim 19, wherein
the mixing ratio is determined again after a positional deviation of the head module is detected.

24. The non-transitory recording medium according to claim 19, wherein
the mixing ratio is determined based on at least one of edge determination information about an arrangement direction of the nozzles in a recording image and attribute tag information of the recording image.

25. The non-transitory recording medium according to claim 19, wherein
the mixing ratio is determined based on the arrangement position information and characteristic information of the nozzle and the ink.

26. The non-transitory recording medium according to claim 19, wherein
the mixing ratio is determined based on the arrangement position information and a relative moving speed of the recording medium with respect to the head modules.

27. The non-transitory recording medium according to claim 19, wherein
a length of the overlapping area is adjusted, and the mixing ratio is determined.

* * * * *